United States Patent [19]

Hazen

[11] 4,321,860
[45] Mar. 30, 1982

[54] CLOSED CHEESE MAKING VAT WITH RECIRCULATING WHEY

[75] Inventor: Gretz L. Hazen, Jefferson, Wis.

[73] Assignee: DEC International Inc., Madison, Wis.

[21] Appl. No.: 112,954

[22] Filed: Jan. 17, 1980

[51] Int. Cl.³ .......................... A23C 3/02; A23C 19/02
[52] U.S. Cl. ......................................... 99/453; 99/462; 241/98
[58] Field of Search .................. 99/463, 464, 452, 453, 99/460, 461, 462, 465, 466, 348, 470, 483; 241/98

[56] References Cited

U.S. PATENT DOCUMENTS

| Re. 29,967 | 4/1979 | Hazen | 241/98 |
| 1,659,415 | 2/1928 | Thomas | 99/348 |
| 3,988,011 | 10/1976 | Kressin | 99/462 |

*Primary Examiner*—Robert W. Jenkins
*Attorney, Agent, or Firm*—Andrus, Sceales, Starke & Sawall

[57] ABSTRACT

A cheese making vat comprising a closed vessel having a vertical shaft mounted for rotation within the vessel. The shaft carries a frame that extends radially outward from the shaft, and a series of vertical blades are mounted on the frame and are designed so that when the shaft is rotated in one direction, the blades act to cut the cheese curds and when the shaft is rotated in the opposite direction the blades act to stir or agitate the curds. During the agitation cycle, whey is continuously withdrawn from the upper end of the vessel and circulated through a heat exchanger to increase the temperature of the whey. The heated whey is then re-introduced into the lower end of the vessel. The circulation of whey, in combination with the movement of the agitator blades, provides a gentle agitation for the curds.

4 Claims, 4 Drawing Figures

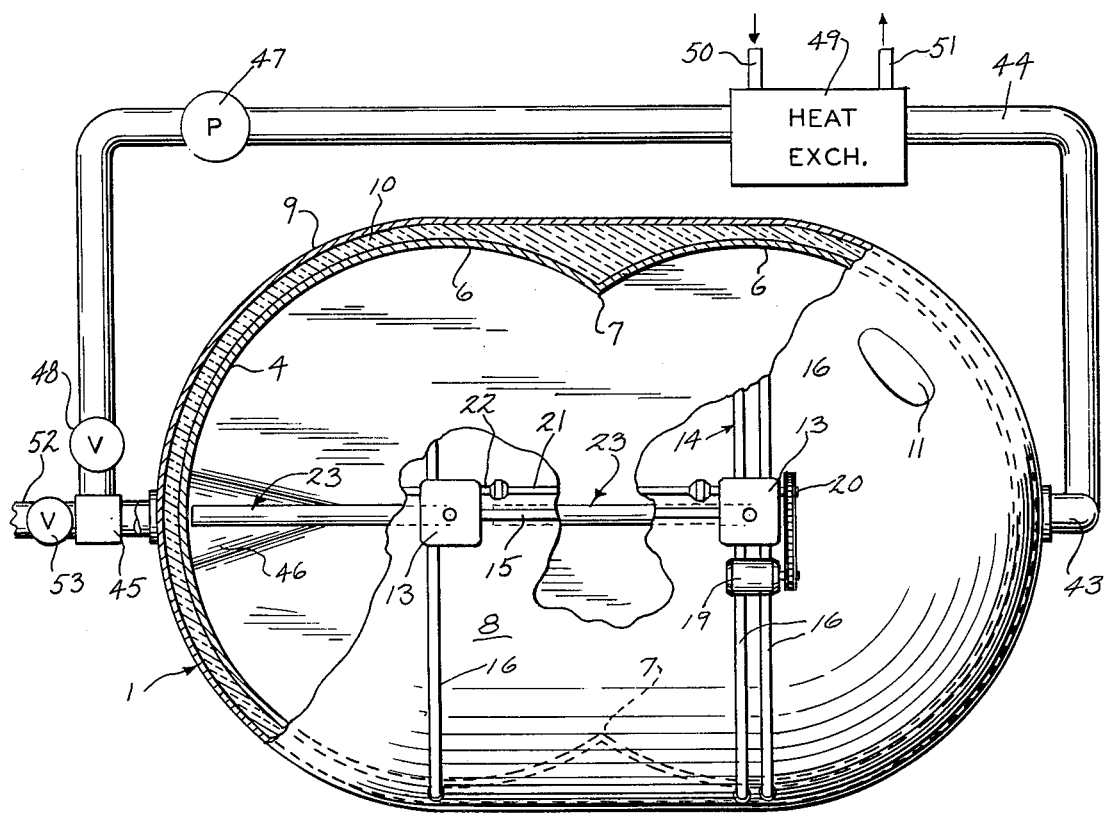
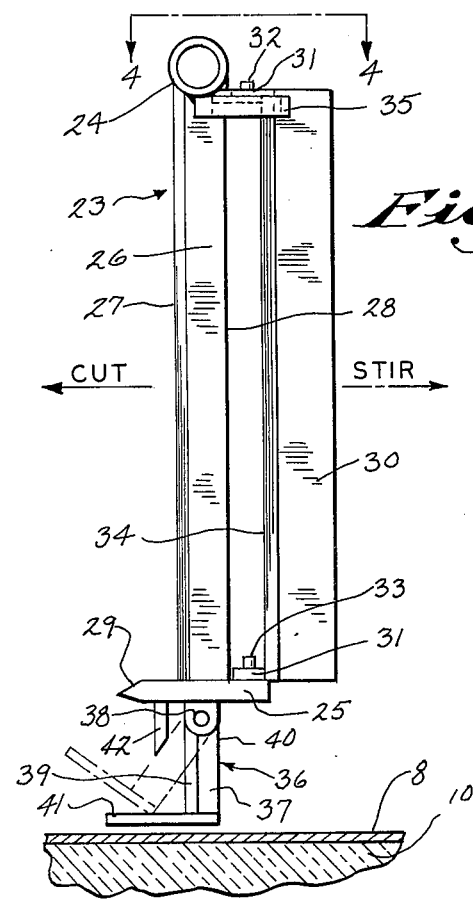
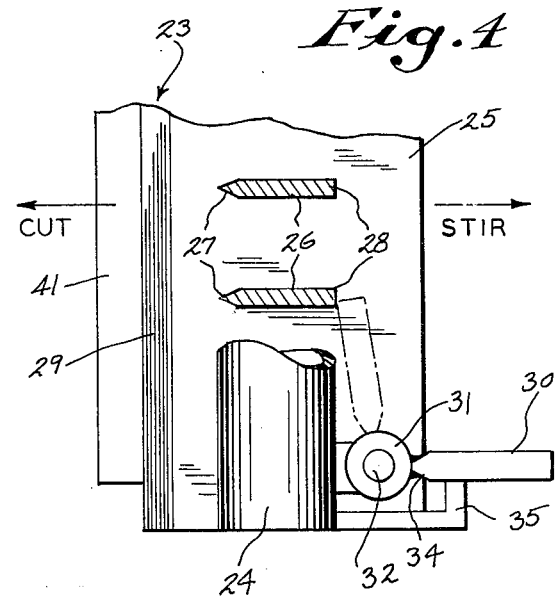

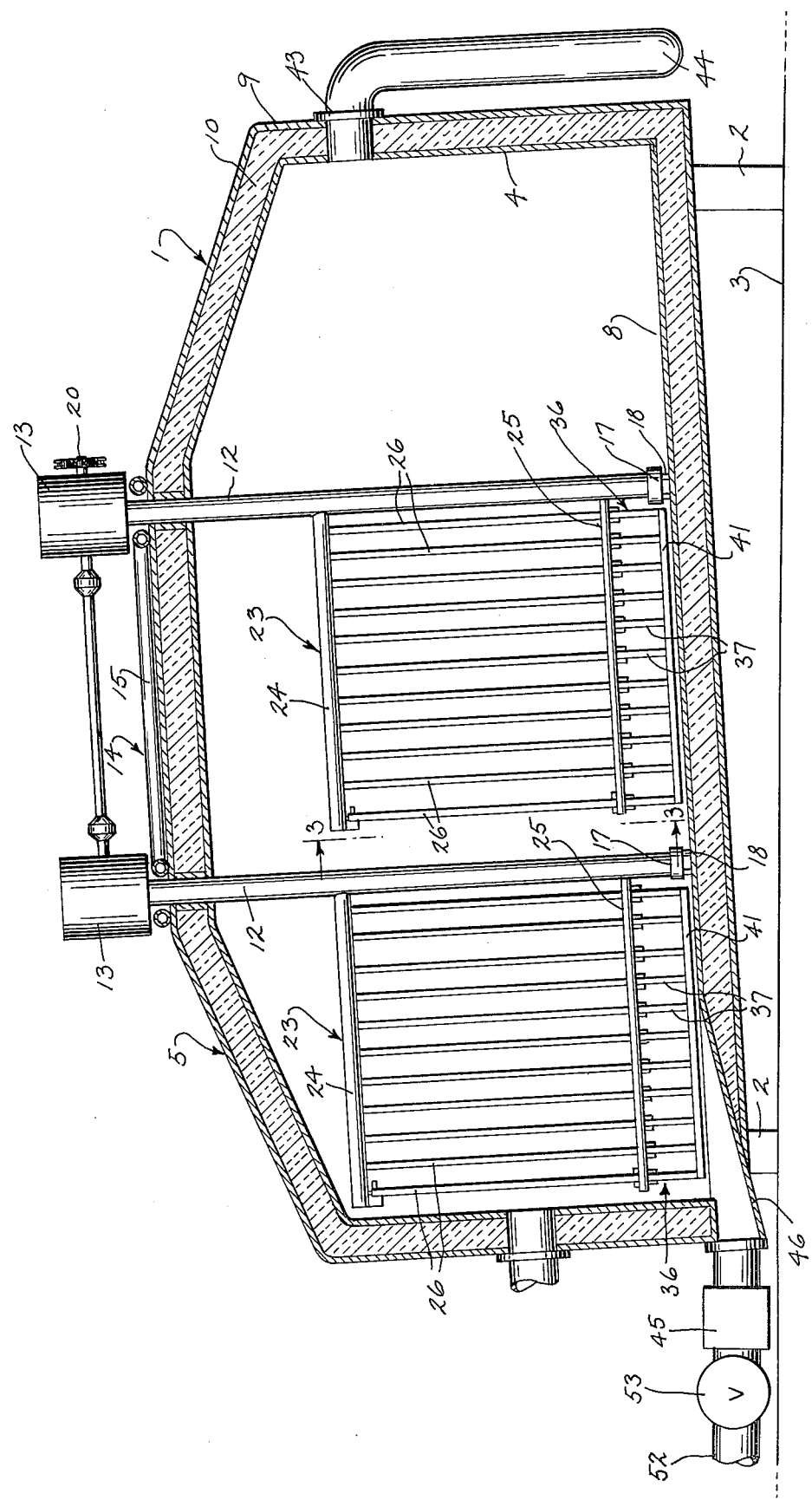

CLOSED CHEESE MAKING VAT WITH RECIRCULATING WHEY

BACKGROUND OF THE INVENTION

Traditionally cottage cheese has been made in open vats. After coagulation of the cheese curds, the curds are cut by a wire frame moved longitudinally along the length of the vat either manually or by a mechanically traversing mechanism. The curds are then cross cut manually by dragging wire harps through the curds. As cottage cheese curds contain very little fat, the curds are fragile and are easily fragmented. With the use of the conventional wire frames and harps, the curds tend to be damaged as they are extruded between the wires.

After cutting the cheese curds are cooked by heating with gentle agitation. The heat is usually supplied through a heated jacket, or by the direct introduction of steam into the vat.

More recently, closed cheese making vats, such as that shown in U.S. Pat. No. Re. 29,967, have replaced open top vats. The closed cheese making vat of the aforementioned patent, can be sealed to the atmosphere during the entire cheese making operation to minimize contamination of the product. With the use of the closed vat, the same implements, which are permanently mounted on the rotating frame, are utilized for both the cutting and stirring operations and it is not necessary to remove and replace the implements during the cheese making operation. This feature reduces the overall cost of the unit, as well as decreasing the labor necessary for installation and removal of various implements.

The cutting and stirring implements, as described in the U.S. Pat. No. Re. 29,967, comprise a series of vertical blades which are mounted on the rotating frame. The blades are designed so that when the shaft is rotated in one direction, a minimum frontal area is provided so that the blades act to cut or slide the curds. When the shaft is rotated in the opposite direction, the blades provide a maximum frontal area to stir or agitate the product.

SUMMARY OF THE INVENTION

The invention is directed to an improved closed cheese making vat having particular use for making cottage cheese. A vertical shaft is mounted for rotation within the vat, and the shaft carries a frame that extends radially outward from the shaft, A series of vertical blades are mounted on the frame and the blades have sharpened edges along one vertical edge and a blunt surface along the opposite edge. When the shaft is rotating in the cutting direction, the sharp edges of the blades slice through the curds to cut the curds, and when the shaft is rotating in the opposite direction, the blunt edges lead in the direction of travel to provide a stirring or agitating action.

In addition, a pivoting vertical blade is mounted on the outer end of the frame. The pivoting blade has a sharpened vertical edge and a broad side surface. When the shaft is rotated in the cutting direction, the sharpened edge of the blade leads in the direction of rotation to cut the curds, and when the direction of rotation is reversed, the blade pivots so that the broad side surface provides a maximum frontal area to provide agitating along the sides of the vessel.

A lower frame section is pivotally connected to the lower edge of the frame and includes a generally horizontal blade which is positioned slightly above the bottom of the vessel. When the shaft is rotated in the stirring direction, the lower horizontal blade will tend to pivot upwardly to an inclined position and is held in this inclined position by a stop to provide increased frontal surface to move the curds along the bottom of the vat.

During the agitation of the curds, whey is continuously withdrawn from the upper end of the vat and after being heated, is recirculated to the lower end of the vat. The heated whey entering the lower end of the vat provides a gentle agitation for the curds, and the vertical stirring blades along with the lower horizontal blades move the curds within the vat to continually expose the curds to the recirculating whey.

With the cheese making vat of the invention, the same implements or tools are utilized for both the cutting and stirring operations and it is not necessary to remove and replace implements during the process. By utilizing the same implements for both stirring and cutting, the overall cost of the unit is reduced, as well as reducing the labor for installation and removal of the implements.

As the vat is a closed unit, which can be sealed to the atmosphere, contamination of the product is minimized.

The process of the invention lends itself to increased yields because the operating conditions can be precisely controlled. Furthermore, the cutting of the curds using the sharp edge blades provides an increased yield over wire cutting devices.

The cheese making vat is particularly adapted for use in making cottage cheese. As cottage cheese curds contain minimum fat, the curds are very fragile. With the construction of the invention, gentle agitation is provided, primarily by the recirculation of the heated whey, which minimizes the fragmentation or disintegration of the fragile curds.

Other objects and advantages will appear in the course of the following description.

DESCRIPTION OF THE DRAWINGS

The drawings illustrate the best mode presently contemplated of carrying out the invention.

In the drawings:

FIG. 1 is a top view of the cheese making vat of the invention with parts broken away and showing the recirculation of the whey in a schematic form;

FIG. 2 is a vertical section of the cheese making vat;

FIG. 3 is a section taken along line 3—3 of FIG. 2; and

FIG. 4 is a view taken along line 4—4 of FIG. 3.

DESCRIPTION OF THE PREFERRED EMBODIMENT

The drawings illustrate a cheese making vat 1 which is an improvement over the vat described in U.S. Pat. No. Re. 29,967. The vat has particular use for making cottage cheese but can also be used for making other types of cheese such as cheddar, Swiss, colby, granulated, Italian and the like.

The vat 1 is supported on a series of legs 2 which rest on a suitable floor or foundation 3. The vat 1 includes an inner open top shell 4 made of stainless steel, or other corrosion resistant material, and which is adapted to contain the cheese curds and whey. A cover 5 encloses the top of the shell. As best illustrated in FIG. 1, the inner shell 4 is composed of a pair of partially cylindrical, intersecting, integral wall sections 6 that are joined together along vertical ridges or joints 7 located diametrically opposite each other. With this construction, the inner shell 4 has a figure-8 shape composed of a pair of end chambers that are joined together by a waist of reduced width. A generally flat bottom wall 8 is connected to the lower edges of the vertical wall sections.

The vat 1 also includes an outer shell 9, formed of stainless steel or the like which is spaced outwardly from the inner shell 4 and a layer of insulating material 10 is disposed between the inner and outer shells.

The provide access to the interior of the vat, a manhole is formed in the cover 5 and is enclosed by a manhole cover 11 which is sealed to the vat by a suitable sealing gasket so that when the cover is in place, the interior of the vat is completed sealed to the atmosphere.

A vertical shaft 12 is disposed centrally within each of the cylindrical wall sections 6 of the inner shell 4. Each shaft 12 is suspended from a gear box or transmission 13 that is mounted on a supporting framework 14 secured to the upper surface of cover 5. Framework 14 comprises a support 15 that extends along the ridge of the tent-shaped cover 5 and a series of legs 16 extend downwardly from the support 15 along the cover.

The lower end of each shaft 12 is journalled within a bushing assembly 17 which is mounted above the bottom wall 8 by a series of feet 18. A suitable seal is provided between each shaft 12 and the cover 5 to maintained the sealed condition of the vat.

The shafts 12 are driven in synchronization by a reversible motor 19 which is mounted on the framework 14. Motor 19 operates through a variable speed drive to drive the input shaft 20 of one of the gear boxes or speed reducing transmissions 13. The transmission is provided with a pair of output shafts one of which is coupled to the respective vertical agitator shaft 12 and the other is connected by a shaft 21 to the input shaft 22 of the other transmission 13. With this drive mechanism, the motor 19 acts to drive both the shafts 12 through the respective transmissions 13.

A frame 23 is secured to each of the shafts 12 and extends radially outward from the shaft to a location adjacent the respective cylindrical wall section 6. Each frame 23 includes an upper horizontal frame member 24 and a lower horizontal frame member 25 which are connected by a series of vertical blades 26. As best illustrated in FIG. 4, each of the blades 26 is provided with a sharp vertical edge 27 and an opposite blunt edge 28.

The upper frame member 24, which is circular in cross sectional configuration, is normally located above the level of the curds and whey contained within the vat, while the lower horizontal member 25 is in the form of a relatively thin plate and has a sharp edge 29.

When the frames 23 are rotated in the direction of the solid arrows in FIGS. 3 and 4, the sharp edges 27 of the blades will lead in the direction of rotation and the blades will cut the mass of curds into a series of concentric cylinders. As the blades 26 of one of the frames 23 move into the cutting path inscribed by the blades of the other cutting frame the concentric cylinders of curd will be cut into long vertical strips. The strips of curd eventually topple over and are cut by the rotating blades into cube-like chunks.

After cutting, the curds are slowly agitated during cooking and to provide agitation the rotation of the shafts 12 is reversed so that the frame 23 and blades 26 move in the direction of the dashed arrows in FIGS. 3 and 4. In this direction of rotation the blunt edges 28 of blades 26 will be leading in the direction of rotation to expose a greater frontal surface area and provide stirring or agitation for the curds.

In addition to the vertical blades 26, each frame 23 carries a pivotable blade 30 which is mounted adjacent the outer end of the frame. As best shown in FIGS. 3 and 4, the upper and lower ends of each blade 30 is provided with eyelets 31 which receive upstanding pins 32 and 33 that are mounted on the horizontal cross members 24 and 25, respectively. With this connection the blade 30 can pivot around the axes of pins 32 and 33.

When the shafts 12 are moved in the cutting direction, as best illustrated in FIG. 4, the blades 30 will trail behind the respective frames with the sharpened edges 34 of the blades leading in the direction of rotation to provide minimum frontal area and cut the curds. When the direction of rotation of the shafts 12 is reversed during agitation, each blade 30 will pivot toward the frame, to provide maximum frontal surface area as shown by the dashed position in FIG. 4. A stop 35 is mounted on each frame 23 and serves to prevent the blade 30 from pivoting outwardly when the frame is moved in the stirring direction.

As illustrated in FIGS. 2 and 3, a lower frame section 36 is pivotally connected to the lower edge of each frame 23. The lower frame section includes a plurality of generally vertical support members 37 which are pivotally connected to lugs 38 that extend downwardly from the lower horizontal member 25. Each of the support members is provided with a sharpened edge 39, which faces in the same direction as the sharpened edges 27 and 29 and an opposite blunt edge 40.

Mounted on the lower ends of the support members 37 is a generally horizontal blade 41 which is disposed slightly above the bottom wall 8 of the vat. The horizontal blade 41 extends substantially the entire length of the frame 23, as shown in FIG. 2.

When the shaft 12 and frame 23 are rotated in the cutting direction, the lower frame section 36 will to swing to the rear and trail behind the frame and the sharpened edges 39 tend to cut through the curds.

During agitation, when rotation of the frame 23 is reversed, the blunt edges 40 of the lower frame section 36 will lead in the direction of rotation and the pressure of the curds on the support members 37 will tend to pivot the lower frame section 36 to the rear, with respect to the direction of rotation, so that the blade 41 will be located at an acute angle to the bottom of the vat as shown by the dashed lines in FIG. 3. In this position, the blade 41 acts as a plow to push the curds along the bottom of the vat. A stop 42 extends downwardly from the lower horizontal member 25 and limits the upward swinging movement of the lower frame section 36 during the stirring or agitating operation.

During agitation, the whey is continuously withdrawn from the upper end of the vat through an outlet 43 and a conduit 44 connects the outlet 43 with a combination whey inlet and drain outlet 45 which is located in the lower end of the vat and positioned opposite to the outlet 43. As shown in FIGS. 1 and 2 the portion of the bottom wall 8 adjacent the drain outlet 45, is sloped downwardly toward the drain outlet 45 as indicated by 46.

To facilitate draining, the entire bottom wall 8 slopes toward the drain outlet 45 and this is most conveniently achieved by mounting the vat at a slight angle of perhaps 4° to the horizontal.

The whey is circulated through the conduit 44 by a pump 47 and the flow of the whey is controlled by valve 48.

The circulating whey is heated by means of a heat exchanger 49 which is connected in the conduit 44. A heating medium, such as heated water or steam, is introduced into the heat exchanger 49 through an inlet line 50 and is withdrawn through line 51. The heated whey being returned to the vat through drain outlet 45 will flow upwardly within the curds to provide a gentle agitating action. The blades 26 and 30 along with the horizontal blade 41, serve to slowly move the curds through the vat, so that the incoming whey will contact and gently agitate the entire mass of curds.

After the cheese making operation has been completed, the product within the vat can be discharged through a drain line 52 which is connected to the drain outlet 45 and flow within the line 52 is controlled by valve 53.

In making cottage cheese, milk at a temperature of approximately 90° F. is introduced into the vat along with a starter, and a coagulant is then added to the milk. After coagulation and upon attaining the proper acidity, the curds are cut by rotating the frames 23 at a speed in the range of about 3 to 7 rpm for a period of about 5 to 10 minutes and generally about 6 minutes. As previously noted, the sharpened edges of the blades 26, as well as blades 30 and the supporting members 37 cut through the curds to slice the same.

After cutting, the curds are allowed to set for a period generally of 3 to 6 minutes. During this period the curds settle to the bottom of the vat and the whey separates out as a liquid layer at the top of the vat.

The pump 47 is then operated and the heating liquid is supplied to the heat exchanger 49 and heated whey is circulated through the conduit 44 and returned to the lower end of the vat. The heating acts to raise the temperature of the whey about 10° to 20°. Along with the recirculation of the whey, the shafts 12 are rotated in the stirring direction to provide a gentle stirring of the curds and the blade 41 rides along the bottom 8 of the vat at an acute angle to push the curds along the bottom. During the initial stage of agitation the shafts 12 are rotated at a very slow rate, generally in the range of about 0.11 to 0.50 rpm. The shafts can either be moved continuously at this slow speed or in increments or steps. The rotation of the frames 23 tends to move the mass of curds into contact with the incoming whey so that the whey passes upwardly through the curd to effect the primary agitation. Excessive velocity of the whey entering the vat can damage the curds, and thus the velocity of the whey being returned to the vat is preferably maintained in the range of 125 to 150 feet per minute. This relatively low velocity can be achieved by a 0.75, 1750 rpm centrifugal pump having a 2 inch inlet and a 2 inch outlet.

The temperature of the recirculating whey will continually rise, and in the production of small curd cottage cheese, when the temperature of the whey reaches a value of about 106° F. to 108° F., which generally occurs in approximately 60 minutes, the speed of agitation is increased to a value of about 4 to 8 rpm. At this time the curds have become relatively firm and have an increased specific gravity. When the temperature of the whey reaches a value of about 135° F., the curds are tested and if they are in proper condition, the entire contents of the vat can be drained through the drain line 52 to a draining and washing unit. As an alternate procedure, the whey can be predrawn through a predraw conduit 54, which is connected to the upper portion of the vat, and the curds can be washed in the vat itself.

When making large curd cottage cheese, the agitation in the initial stage of cooking is maintained at a value of about 0.11 rpm to 0.5 rpm until the temperature of the whey increases to a value of about 112° F. At this time, the speed of agitation is increased to a value in the range of 3 to 6 rpm and this rate of agitation is maintained until the whey achieves the cut-off temperature of 135° F.

The invention provides an increased yield by utilizing the sharpened cutting blades as opposed to the traditional wire-knife cutters which tend to extrude the curds through the wires. Furthermore, the yield is increased by the manner of agitating the curds through the recirculation of whey in combination with the slow movement of the curds achieved by the stirring blades. This combination of movements provides the necessary gentle agitation and yet minimizes the fragmentation or disintegration of the fragile low fat curds.

As the cutting and stirring implements are permanently attached to the frame, there is no necessity for removing and replacing implements during the cheese making operation. As the vat is closed, contamination of the product is minimized and the closed vat also lends itself to clean-in-place operations.

While the drawings have illustrated the vat as having a generally figure-8 shape, it is contemplated that the invention can also be utilized with vats of circular or other configurations.

Various modes of carrying out the invention are contemplated as being within the scope of the following claims particularly pointing out and distinctly claiming the subject matter which is regarded as the invention.

I claim:

1. A cheese making vat, comprising a vessel to contain cheese curds and whey, a vertical shaft disposed within the vessel, a frame connected to the shaft and extending outwardly from the shaft, reversible drive means for rotating the shaft, implement means carried by the frame and arranged so that when the shaft is rotated in a cutting direction the implement means acts to cut the curds and when the shaft is rotated in the opposite stirring direction the implement means acts to stir the curds, outlet means disposed in the upper portion of the vessel, inlet means disposed in the lower portion of the vessel, conduit means connecting the outlet means and the inlet means, means for recirculating whey from the upper portion of the vessel through said outlet means and said conduit means and introducing the whey into the lower portion of the vessel through said inlet means, and a heat exchanger unit disposed in the conduit means for heating the whey passing through said conduit means, the introduction of heated whey into said vessel through said inlet means providing gentle agitation for the curds and said implement means serving to move the curds past said inlet means to continuously expose the curds to the recirculating whey.

2. The cheese making vat of claim 1, wherein said implement means comprises a plurality of vertical blades mounted on the frame, said blades having sharpened edges facing in the cutting direction and having blunt edges facing in the stirring direction.

3. The cheese making vat of claim 1 wherein said inlet means is disposed opposite said outlet means.

4. The cheese making vat of claim 1, and including a lower frame section pivotally connected to the lower portion of said frame and including a generally horizontal blade member disposed adjacent the bottom of said vessel, said lower frame section being disposed to freely pivot relative to the frame when the shaft is rotated in the stirring direction whereby said horizontal blade member is disposed at an acute angle with respect to the bottom of the vat to push the curds along the bottom.

* * * * *